United States Patent
Salgado et al.

(10) Patent No.: US 10,552,129 B2
(45) Date of Patent: Feb. 4, 2020

(54) AGGLOMERATIVE ALGORITHM FOR GRAPH CLUSTERING

(71) Applicant: SAP SE, Walldorf (DE)

(72) Inventors: Cesar Salgado, Porto Alegre (BR); Gustavo Marques Netto, São Leopoldo (BR); Leonardo Fernando dos Santos Moura, Porto Alegre (BR); Rodrigo Augusto Boos, Porto Alegre (BR)

(73) Assignee: SAP SE, Walldorf (DE)

( * ) Notice: Subject to any disclaimer, the term of this patent is extended or adjusted under 35 U.S.C. 154(b) by 48 days.

(21) Appl. No.: 15/906,652

(22) Filed: Feb. 27, 2018

(65) Prior Publication Data

US 2019/0179621 A1    Jun. 13, 2019

Related U.S. Application Data

(60) Provisional application No. 62/597,668, filed on Dec. 12, 2017.

(51) Int. Cl.

| G06F 8/41  | (2018.01) |
|---|---|
| G06F 8/30  | (2018.01) |
| G06F 9/38  | (2018.01) |
| G06F 17/30 | (2006.01) |
| G06F 16/35 | (2019.01) |

(52) U.S. Cl.
CPC .............. *G06F 8/443* (2013.01); *G06F 8/31* (2013.01); *G06F 9/3867* (2013.01); *G06F 16/358* (2019.01)

(58) Field of Classification Search
CPC ... G06F 12/023; G06F 15/76; G06F 2212/251
USPC ........................................................ 711/154
See application file for complete search history.

(56) References Cited

U.S. PATENT DOCUMENTS

| 8,243,988 B1* | 8/2012 | Buddemeier | G06K 9/00677 382/103 |
|---|---|---|---|
| 8,966,457 B2* | 2/2015 | Ebcioglu | G06F 17/5045 717/136 |
| 2010/0115206 A1* | 5/2010 | de la Iglesia | G06F 12/0862 711/137 |
| 2010/0274785 A1* | 10/2010 | Procopiuc | G06F 16/22 707/737 |
| 2017/0091342 A1* | 3/2017 | Sun | G06F 16/9024 |
| 2017/0097884 A1* | 4/2017 | Werner | G06F 12/023 |
| 2017/0142151 A1* | 5/2017 | Jusko | H04L 63/1433 |
| 2017/0161038 A1* | 6/2017 | Ottoni | G06F 16/9024 |

\* cited by examiner

*Primary Examiner* — John Q Chavis
(74) *Attorney, Agent, or Firm* — Sterne, Kessler, Goldstein & Fox P.L.L.C.

(57) ABSTRACT

Disclosed herein are system, method, and computer program product embodiments for determining clusters of operations in a data processing pipeline. By clustering the operations according to the operations' programming languages using the algorithm disclosed herein, performance efficiency gains can be achieved. The algorithm is iterative, traversing all operations in a data processing pipeline with subsequent iterations addressing the clustering regime determined by prior iterations.

20 Claims, 9 Drawing Sheets

AGGLOMERATIVE ALGORITHM FOR GRAPH CLUSTERING

CROSS REFERENCE TO RELATED APPLICATIONS

This application claims the benefit of U.S. Provisional Patent Application 62/597,668, by Salgado, et al., "Agglomerative Algorithm for Graph Clustering," filed Dec. 12, 2017, which is hereby incorporated by reference in its entirety.

BACKGROUND

Generally speaking, organizations increasingly integrate vast amounts of data from a variety of sources and applications into big-data systems. Such big-data systems have been developed and deployed across most modern industries, including the financial and banking sectors, transportation services, entertainment industries, insurance, healthcare, education, medicine, retail, etc. The immense amount of data presents unique technical problems requiring distinct solutions because traditional data processing applications are unable to fully utilize and extract meaning from these gargantuan data sets, given their sheer scale.

Big-data applications have been developed that integrate, manage, and organize big-data systems, allowing organizations to harness the data's value for programmatic, analytical, diagnostic, or other suitable purposes. These big-data applications require specialized solutions for ingesting and transforming the data and facilitating communication between applications and platforms. These solutions must be highly optimized and efficient.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining clusters of operations in a data processing pipeline.

A data processing pipeline is a set of data-transforming or processing operations connected in a series or run in parallel. An exemplary data processing pipeline could convert data from one format to another, present a visualization of the data, share data across applications, etc. In an embodiment, the data acted upon can be a data lake, message stream, relational database, semi-structured data (CSV, logs, xml, etc.), unstructured data, binary data (images, audio, video, etc.), or other suitable data repository. In an embodiment, the data sets processed are very large, having thousands, millions, billions, or trillions (or more) records.

Operations in a data processing pipeline can be predefined or custom-built functions or modules. Data processing pipelines including more than one operation may also specify connections between the operations. Thus, an operation may receive a data input, transform, modify, or otherwise operate upon the inputted data, and then pass the transformed data as output to a subsequent operation, component, or user to be further modified or acted upon. An operation may have zero or more inputs and zero or more outputs. The operations can also run in parallel, simultaneously, or other suitable fashion. In an embodiment, an operation may have been created in one or more programming languages. Additional performance costs arises when an operation programmed in one programming language passes large data sets to or receives large data sets from an operation programmed in a different programming language.

A cluster of operations is a logical construct by which the operations in a data processing pipeline can be grouped to enhance efficiency. In an embodiment, a performance gain occurs when grouping the operations by their programming languages because of the cost incurred if the operations have disparate programming languages.

In an embodiment, organizations can view the operations and their connections graphically in a visualization tool. Such a visualization tool allows organizations to easily specify operations and build data processing pipelines.

Figure 1:
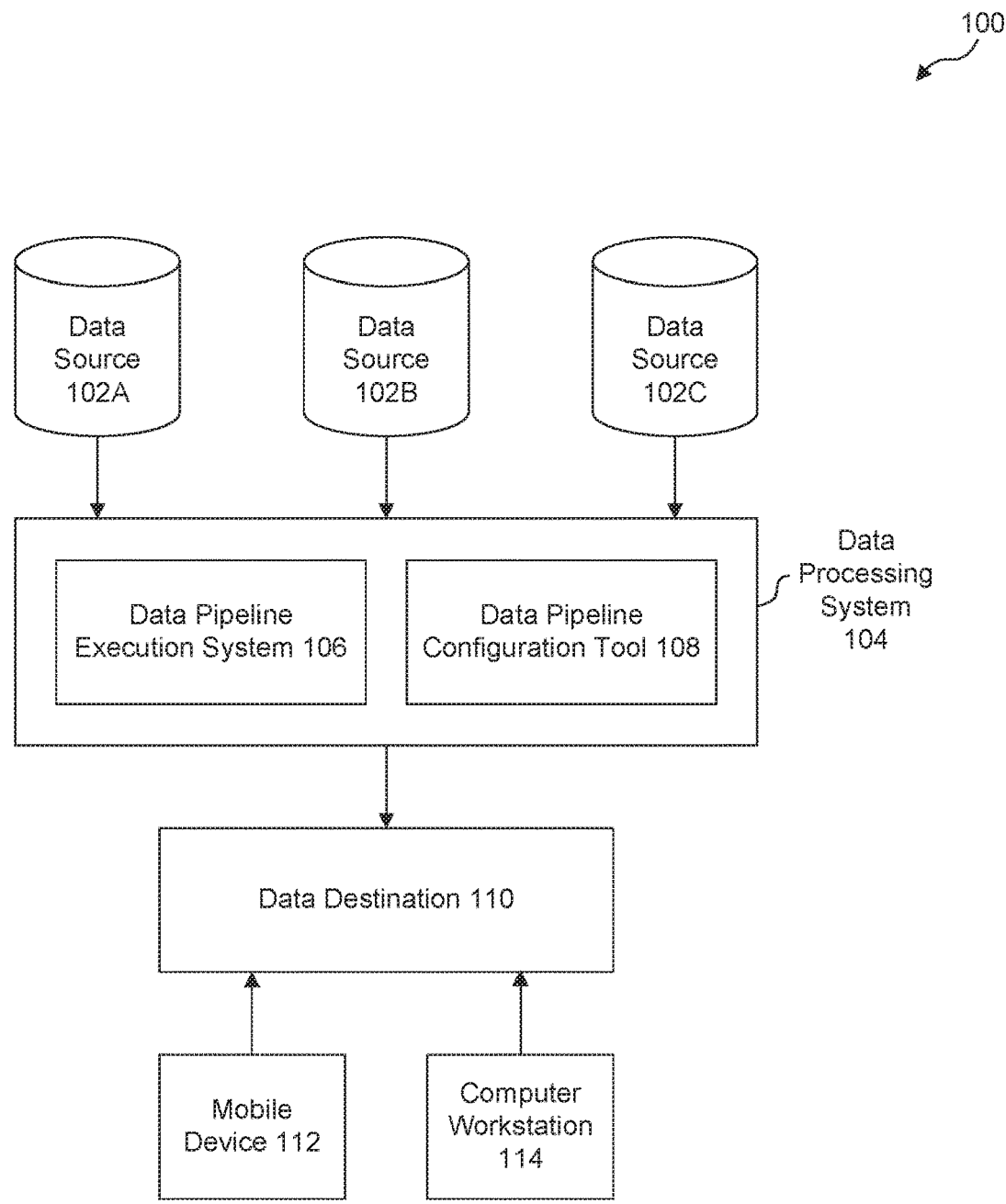
FIG. 1 is a block diagram of a data processing system, according to some embodiments.

FIG. 1 is a block diagram illustrating environment 100 having a data processing system 104, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 includes data sources 102, data processing system 104, data pipeline execution system 106, data pipeline configuration tool 108, data destination 110, mobile device(s) 112, and computer workstation(s) 114.

Data sources 102 are systems storing vast amounts of data in various forms. In an embodiment, data sources 102 could be database systems such as any suitable relational database product. Data sources 102 could further be message queues or stream processing platforms such as Apache Kafka or Apache Spark or other data storage systems like Apache Hadoop, HDFS, or Amazon S3, to name a few examples. In an embodiment, data sources 102 store thousands, millions, billions, or trillions (or more) of objects, rows, transactions, records, files, logs, etc. while allowing for the creation, retrieval, and management of this data. In an embodiment, data sources 102 utilize scalable, distributed computing to efficiently catalog the data.

Data processing system 104 includes data pipeline execution system 106 and data pipeline configuration tool 108. Data processing system 104 transforms, converts, modifies, manages, transfers, adds to, subtracts from, analyzes or otherwise interacts with data from data sources 102 before passing the result to data destination 110. Exemplary operations conducted within data processing system 104 could include: converting data from one format to another, preparing data for visualization, organizing the data, mining the data using regular expressions, natural language processors, or other mechanism, sharing data between different web applications, editing video/audio files, or any of a myriad of suitable interactions. In an embodiment, data processing system 104 executes these operations in real-time using parallel and distributed processing.

Data pipeline execution system 106, a sub-component of data processing system 104, receives data from data sources 102 and performs operations on the data before passing the data to data destination 110. Data pipeline execution system 106 clusters the operations contained in the data processing system 104 to achieve performance gains, as is further detailed below. Data pipeline execution system 106 determines which operations to execute through a configuration specified through data pipeline configuration tool 108.

Data pipeline configuration tool 108 allows an organization to create, modify, and edit data processing pipelines. In an embodiment, data pipeline configuration tool 108 provides a visualization tool whereby a data administrator can visualize the data processing pipeline in graphical form. Data pipeline configuration tool 108 can display any operations used in data pipeline execution system 106, any connections between the operations, and the programming languages of each operation. In an embodiment, data pipeline configuration tool 108 provides the ability to add to, delete from, modify, or otherwise configure data processing system 104.

Data destination 110 provides temporary or permanent storage for the transformed data and allows end users or ancillary computing components to view or interact with the transformed data. In an embodiment, data destination 110 can be a terminal, web browser, text file, excel spread sheet, graph, image file, or any other tool by which the data, as transformed by the data processing pipeline, can be visualized or otherwise interacted with. In an embodiment, data destination 110 provides advanced analytical mechanisms such as graphs, charts, or other visualization tools, providing further means by which to analyze the large data sets.

Mobile device(s) 112 and/or computer workstation(s) 114 provide end users a mechanism to view the transformed data, analytical representations of the transformed data, or other suitable portrayals thereof. In an embodiment, mobile device(s) 112 and computer workstation(s) 114 connect to data destination 110 via the Internet or other public network. In an alternate embodiment, data destination 110 and either mobile device(s) 112 or computer workstation(s) 114 reside on the same device.

Figure 2A:
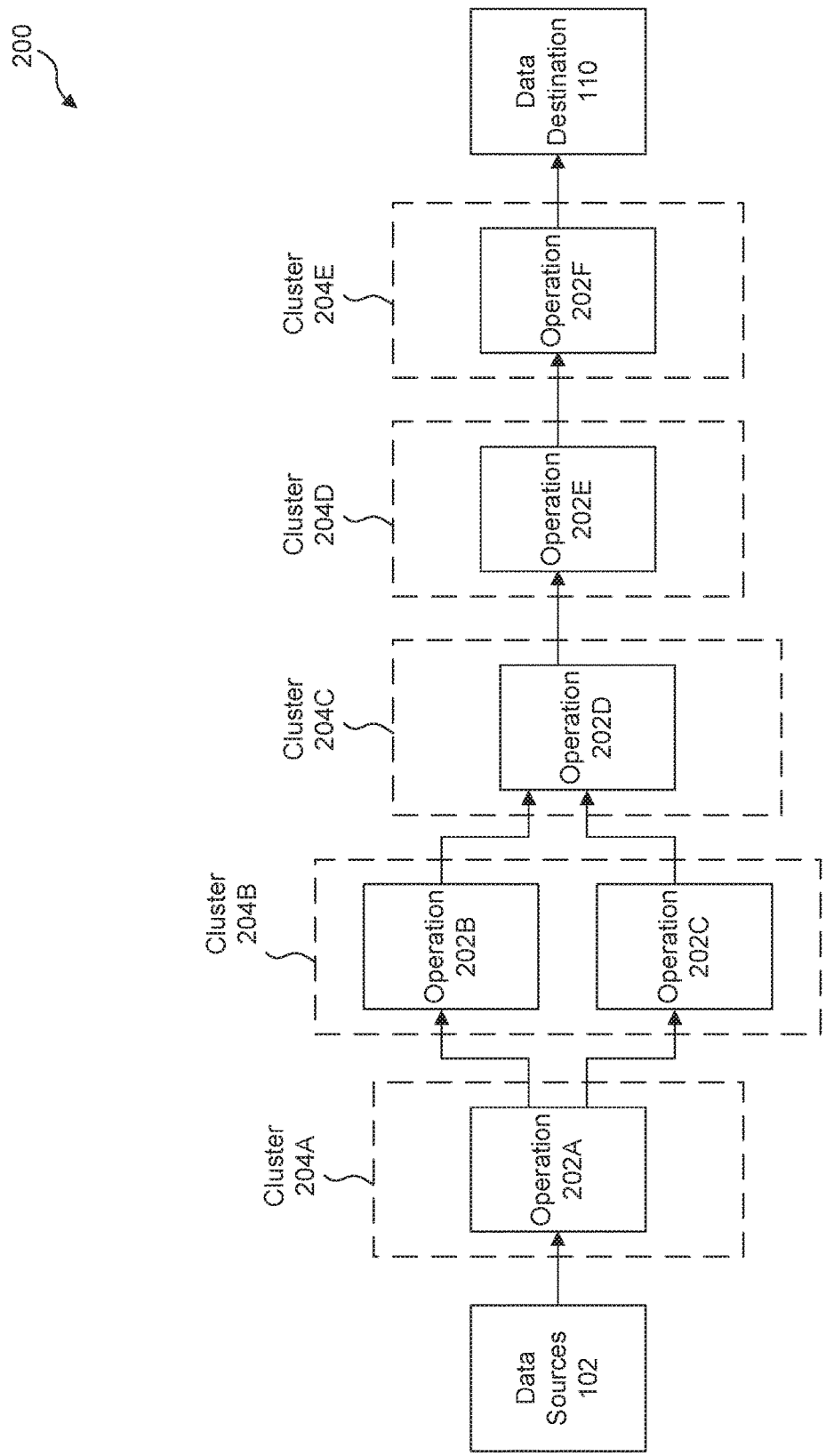
FIGS. 2A-2B are block diagrams of data processing pipelines utilizing clusters, according to some embodiments.

FIG. 2A is a block diagram illustrating an example data processing pipeline 200. Any functionality herein may be performed by any type of structure in the diagram, such as a module or dedicated device, in hardware, software, or any combination thereof. Any block in the block diagram of FIG. 2A may be regarded as a module, apparatus, dedicated device, general-purpose processor, engine, state machine, application, functional element, or related technology capable of and configured to perform its corresponding operation(s) described herein. Data processing pipeline 200 includes operations 202 and clusters 204, as well as data sources 102 and data destination 110 detailed in FIG. 1.

In FIG. 2A, which is only one exemplary data processing pipeline 200, data processing pipeline 200 includes cluster 204A (encompassing operation 202A), cluster 204B (encompassing operation 202B and operation 202C), cluster 204C (including operation 202D), and cluster 204E (encompassing operation 202F). Here, clusters 204 are only an illustrative example of one particular embodiment. A potential inefficiency of the particular clustering arrangement in FIG. 2A will become apparent during the below discussion of FIG. 2B.

Operations 202 are functions, programs, modules, executables, or other behaviors that can be performed within data processing pipeline 200. Operations 202 can perform a litany of exemplary functions such as: converting data format, deleting records from the data, validating the data, performing calculations using the data, filtering the data, aggregating the data, and many other suitable functions.

Operations 202, when aggregated and run sequentially or in parallel, can perform more elaborate functions and tasks. For exemplary purposes, data processing pipeline 200 could receive as input a number of video files and perform a sequence of operations to identify particular objects in the various video files. Further operations in this exemplary data processing pipeline 200 could subsequently organize the matches into a spreadsheet and display the spreadsheet for review by a human being or ancillary computer component. One skilled in the relevant arts will appreciate the vast array of disparate tasks that could be accomplished by data processing system 104, as well as the potentially complicated interactions between various operations 202 in data processing pipeline 200.

In an embodiment, operations 202 receive a data input and transform, modify, observe, write to, or otherwise interact with the data input. Operations 202 can subsequently send or output the transformed data to another operation in operations 202 or to data destination 110. In some embodiments, this passing of data between operations 202, such as the data passing from operation 202A to operation 202B, will henceforth be referred to as occurring through connections, edges, inputs, or outputs. Operation 202A may have zero or more inputs and zero or more outputs.

Operation 202A may be implemented in different programming languages. In an embodiment, a programming language can be any set or group of related systems of symbols used for writing instructions in human-readable form. When connections between operations 202 connect an exemplary operation 202A created in one particular programming language with exemplary operation 202B created in a different programming language, performance inefficiencies can arise.

First, the data flowing through data processing system 104 may need to be copied entirely when the programming languages of operation 202A and 202B differ. When processing and manipulating large data sets, such a copy is an expensive transaction from a performance standpoint. Alternatively, in order to share a data set between operation 202A and 202B, the data can be serialized by operation 204A and then deserialized by operation 202B. Serialization involves converting the data set into a series of bytes for generalized storage. In an embodiment, Operation 202B can then deserialize the data, i.e., convert it from the series of bytes back into a useable data object. Serializing and deserializing large data sets in this fashion can be time-consuming. On the other hand, if operation 202A and operation 202B share a programming language, then a reference or pointer to the data can be shared between operation 202A and operation 202B, negating the need for a deep copy or serialization/deserialization.

Second, when operation 202A and operation 202B have disparate programming languages, a separate and distinct operating system process may need to be spawned for operation 202A and operation 202B. As a data pipeline grows larger and more complex and complicated, memory utilization issues and blocking can arise due to multitudinous processes running in parallel. However, if operation 202A and operation 202B share a programming language, operation 202A and operation 202B can execute within a shared operating system process.

Operation 202A could be programmed in any suitable programming language. Moreover, operation 202A may have been programmed in more than one programming language. For instance, an exemplary operation 202A can have been programmed in Python, C++, and Go. Accordingly, data pipeline execution system 106 can select between these versions of operation 202A when executing operation 202A.

Clusters 204 organize operations 202 to achieve efficiency gains when executing data processing pipeline 200. In an embodiment, clusters 204 group operations 202 programmatically according to the programming languages of operations 202 in order to achieve an improved or optimized clustering regime. Clusters 204 can be thought of as logical constructs that are themselves associated with a set of programming languages. In other words, cluster 204A would have a set of associated programming languages, cluster 204B would have a set of associated programming languages, etc. A connection is an internal connection if the connection does not cross the boundary between different clusters 204 and is, instead, contained entirely within one cluster in clusters 204.

In an embodiment, data pipeline execution system 106 determines the set of programming languages associated with clusters 204 using the programming languages of operations 202 encompassed by clusters 204. In such an embodiment, the set of programming languages associated with cluster 204A is the intersection of the programming languages of the operations 202 encompassed by cluster 204A. One skilled in the arts will appreciate that an optimized clustering regime can achieve significant efficiency gains in light of the efficiency losses that occur when an operation 204A connects to an operation 204B programmed in a different programming language. Data destination 110, described above in relation to FIG. 1, receives the transformed data after operations 202 execute and complete.

Figure 2B:
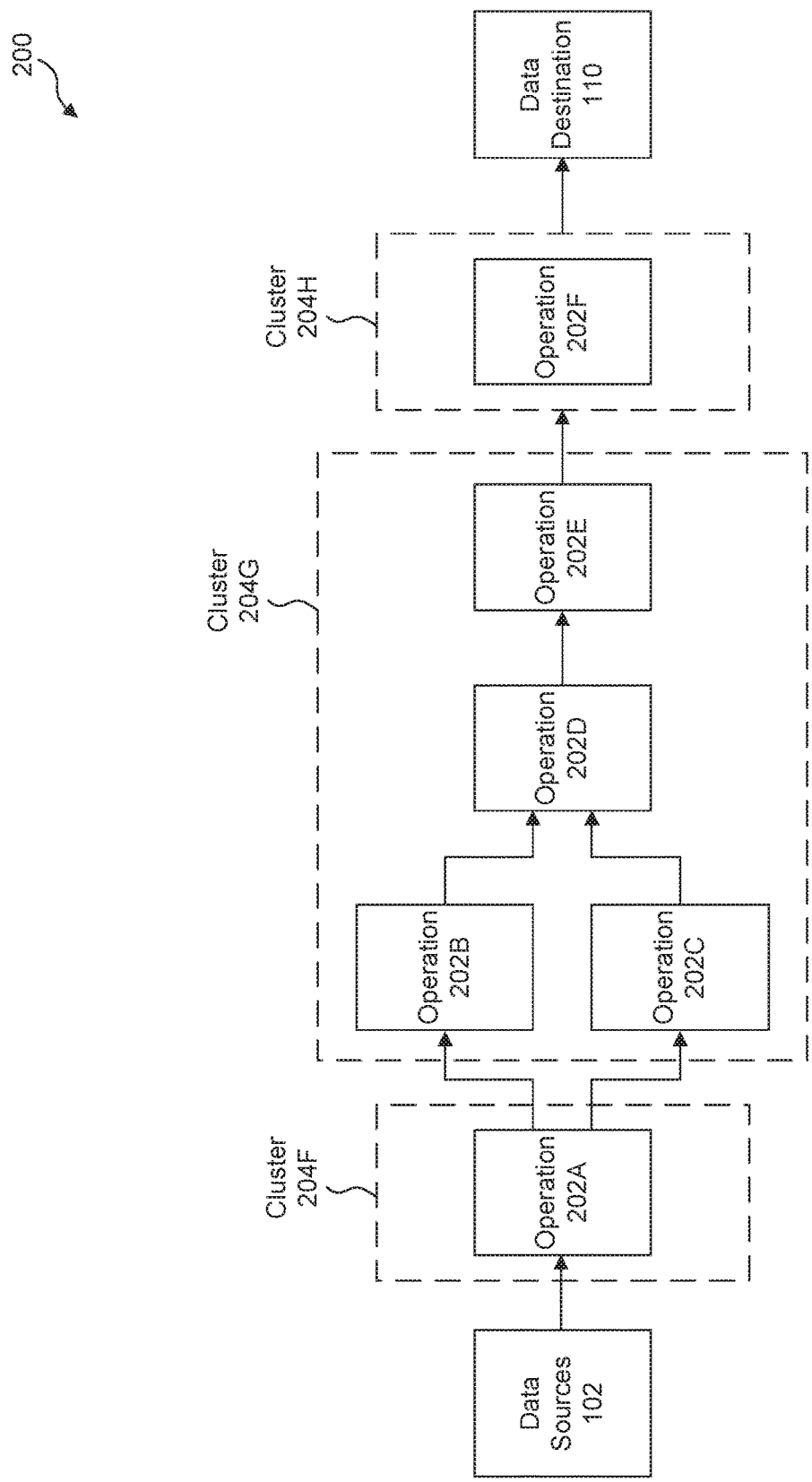

FIG. 2B is a block diagram illustrating example data processing pipeline 200, which is clustered differently compared to data processing pipeline 200 displayed in FIG. 2A. Any operations or operational flow depicted herein may be executed sequentially, or they may alternatively be executed concurrently, with more than one operation being performed simultaneously, or any combination of the above.

Any operation herein may be performed by any type of structure in the diagram, such as a module or dedicated device, in hardware, software, or any combination thereof.

Any block in the block diagram of FIG. 2B may be regarded as a module, apparatus, dedicated device, general-purpose processor, engine, state machine, application, functional element, or related technology capable of and configured to perform its corresponding operation(s) described herein.

FIG. 2B shows data processing pipeline 200, which includes cluster 204F (encompassing operation 202A), cluster 204G (encompassing operation 202B, operation 202C, operation 202D, and operation 202E), and cluster 204H (encompassing operation 202F). In light of the foregoing discussion of FIG. 2A, one skilled in the arts will understand that the clustering arrangement of FIG. 2B could demonstrate improved efficiency as compared to the clustering arrangement of FIG. 2A.

In FIG. 2B, cluster 204G requires that operation 204B, operation 204C, operation 204D, and operation 204E share a common programming language. Operations 202B-202E could run or execute in the same programming language, as determined by the set of programming languages attributed to cluster 204G. In other words, data pipeline execution system 106 could intelligently choose versions of operation 202B, operation 202C, operation 202D, and operation 202E having the same programming language. Such a cluster configuration would avoid any performance degradations from switching between operations 202 written in different languages. A deep copy of the data set could be avoided and the operations sharing a language consolidated into one operating system process.

One skilled in the arts will appreciate that even in the simple figure presented in FIGS. 2A-2B, a massive amount of different clustering configurations can potentially be determined, depending upon the programming languages available for each operations 202. Moreover, certain clustering configurations will be more efficient and beneficial than others. It is with this in mind that we will now discuss a method for determining clusters 204.

Figure 3:
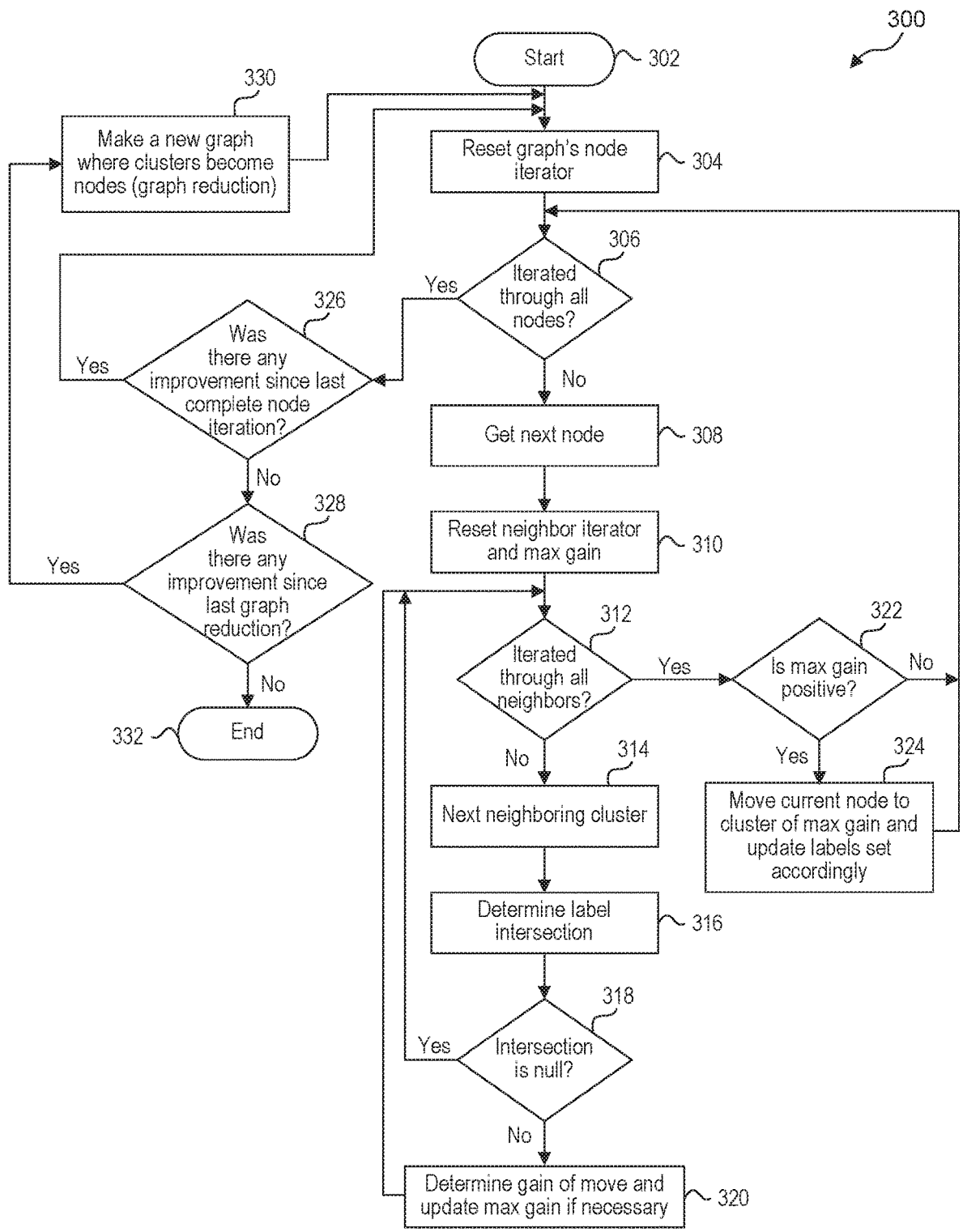
FIG. 3 is a flowchart illustrating a process for determining the clusters in a data processing pipeline, according to some embodiments.

FIG. 3 is a flowchart for method 300, which determines clusters 204 for operations 202 in data processing pipeline 200, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein.

Throughout the discussion below, the term "nodes" will be used synonymously with operations 202, as described in FIGS. 2A-2B. Similarly, the programming languages associated with each operation in operations 202 will be referred to as a "set of labels" or "labels." A cluster will also have an associated "set of labels" or "labels."

In an embodiment, method 300 is implemented according to the following example pseudocode:

```
Input: A graph with a set of allowable labels for each node.
Output: A partition of the graph, and for each of its clusters, a set of labels that represents the
intersection of the label's set of its internal nodes.
outerImprovement = True
While outerImprovement:
    outerImprovement = False
    innerImprovement = True
    Initialize one cluster per node from graph
    While innerImprovement:
        innerImprovement = False
        For-each node in graph:
            maxGain = 0
            bestCluster = NULL
```

```
For-each neighboring cluster of node:
        intersection = node.Labels ∩ neighborCluster.Labels
        If (intersection ≠ ∅ and
            gainOfMoving(node, neighborCluster) > maxGain):
                bestCluster = neighborCluster
                maxGain = gainOfMoving(node, neighborCluster)
        If maxGain > 0:
        innerImprovement = True
        outerImprovement = True
        moveToCluster(node, bestCluster)
If outerImprovement:
    Create new graph where its nodes are the clusters found and the edges are the ones
        which crosses them.
```

However, in other embodiments, method 300 can be implemented using other code/pseudocode/algorithms.

In 302, method 300 commences. Initially, method 300 initializes one cluster for each node in the graph. In other words, the same number of clusters as nodes will exist, each cluster containing exactly one node. The set of labels associated with each cluster will be set to the set of labels (in an embodiment, the programming languages available for the operation) associated with the node encompassed.

In 304, method 300 resets the graph's nodes iterator. A node iterator is a tool by which to traverse all nodes in data processing pipeline 200. Such traversing may occur sequentially, randomly, or through any other means.

In 306, method 300 determines if method 300 iterated through all the nodes since the last nodes iterator reset. This is a conditional statement. If all nodes have been examined, method 300 proceeds to 326. If nodes remain un-traversed, method 300 proceeds to 308.

In 308, method 300 gets the next node using the node iterator. In an embodiment, the first determined node can be the first operation 202A in data processing pipeline 200. On subsequent iterations of the looping mechanisms in method 300, 308 receives a different node. In other words, if method 300 examines operations 202 in FIG. 2, the initial node obtained could be operation 202A, followed by operation 202B, then operation 202C, etc. In an alternate embodiment, the nodes are not returned numerically or sequentially, but 308 determines the next node randomly, using pointers, or through another suitable methodology by which all nodes in data processing pipeline 200 are ultimately examined. This disclosure will henceforth refer to the node received by 308 as the current node.

In 310, method 300 resets the neighbor iterator and max gain. The neighbor iterator can be a tool by which to traverse all neighboring clusters of the current node in data processing pipeline 200. The neighbor iterator traverses all clusters sharing a connection or edge with the current node. The max gain is a variable used to store information as the neighbor iterator traverses each neighboring cluster; summarily, the max gain stores the highest value of moving a node to a neighboring cluster as method 300 iterates through the neighboring clusters.

In 312, method 300 determines whether all the current node's neighboring clusters were traversed since the last neighbor iterator reset. This is a conditional statement. If all neighboring clusters have been examined, then method 300 proceeds to 322. If not, then method 300 proceeds to 314.

In 314, method 300 obtains the next neighboring cluster of the current node. As indicated in the examples of FIGS. 2A-2B, more than one neighboring cluster may connect to the current node. While the neighboring clusters can be traversed in random, specific, or any other suitable order, the particular order in which the neighboring clusters are traversed is not germane to method 300. For illustrative purposes, in reference to FIGS. 2A-2B, 314 would determine the neighboring clusters of operation 202A to be a set containing only cluster 204B. For further illustration, 314, if getting the neighboring clusters of operation 202B, would yield a set of clusters 204A and 204C. This disclosure will henceforth refer to the neighboring cluster determined in 314 as the current neighboring cluster.

In 316, method 300 determines a label intersection between the current node and the current neighboring cluster. In an embodiment, the label for the current node is the programming languages associated with the current node, and the label for the current neighboring cluster is the intersection of all nodes encompassed by the neighboring cluster. Thus, in an embodiment, 316 determines the programming languages shared between the current node and the current neighboring cluster. In other words, 316 takes the intersection between these two sets (the labels of the current node and the labels of the current neighboring cluster) to derive a third set. This disclosure will henceforth refer to this third set of programming languages as the label intersection.

In 318, method 300 checks if the label intersection (determined in 316) is null. This is a conditional statement. If the label intersection is null, then method 300 returns to 312 to obtain the next neighboring cluster via the neighbor iterator (and eventually to 322 if all the neighboring clusters of the current node have been examined). If the label intersection is not null, i.e., the label intersection is not the empty set, then method 300 proceeds to 320.

In 320, method 300 determines the gain of moving the current node to the current neighboring cluster. In an embodiment, the gain of moving reflects potential gains in efficiency if the current node departs its present cluster for the current neighboring cluster. In an embodiment, 320 determines the gain of moving by examining the number of additional internal connections that would be contained within the current neighboring cluster if it expanded to include the current node, and subtracting this number from the number of additional internal connections that would cross the boundaries between the current node's previous cluster and the new one. 320 also updates the max gain (to the calculated gain of moving) if the calculated gain of moving is higher than the current max gain. A connection is an internal connection if the connection does not cross the boundary between different clusters. Following 320, method 300 returns to 312.

In 322 (from 312), method 300 determines if the max gain is positive, i.e., greater than zero. This is a conditional statement. If the max gain is not positive, method 300 returns to 306, proceeding to the next node. If the max gain is positive, method 300 proceeds to 324.

In 324, method 300 moves the current node to the neighboring cluster with the best cluster. The best cluster is the neighboring cluster with the highest gain of moving. 324 also updates the labels of the cluster that formerly contained the current node and the cluster that now contains the current node. The labels update maintains each cluster's label-set as being the intersection of all of its contained nodes' labels. Method 300 then returns to 306, proceeding to the next node.

In 326, which executes after method 300 has iterated across all nodes as determined at 306, method 300 determines if any improvement occurred since the last complete node iteration. In an embodiment, improvements are any changes to the clustering regime. This is a conditional statement. If improvements occurred, then method 300 returns to 304 and a subsequent node iteration begins. If no improvements occurred during the prior node iteration, method 300 proceeds to 328.

In 328, method 300 determines if any improvement occurred since the last graph reduction (a concept discussed in detail below). This is a conditional statement. If no improvement occurred since the last graph reduction, then method 300 proceeds to 332 and method 300 completes. If an improvement occurred since the last graph reduction, then method 300 proceeds to 330.

In 330, method 300 performs a graph reduction. A graph reduction is the creation of a new graph where the clusters become nodes of the new graph. The connections between the clusters serve as the connections between the new nodes. Method 300 proceeds to 302, and a subsequent iteration occurs with the reduced graph reflecting the clustering determination from the previous iteration and the subsequent node iteration acting upon the reduced graph.

FIGS. 4A-4D are flowcharts illustrating an exemplary cluster determination 400, according to some embodiments. FIGS. 4A-4D provide an example illustration, for exemplary purposes, of method 300 running against an illustrative and theoretical data processing pipeline.

Figure 4A:
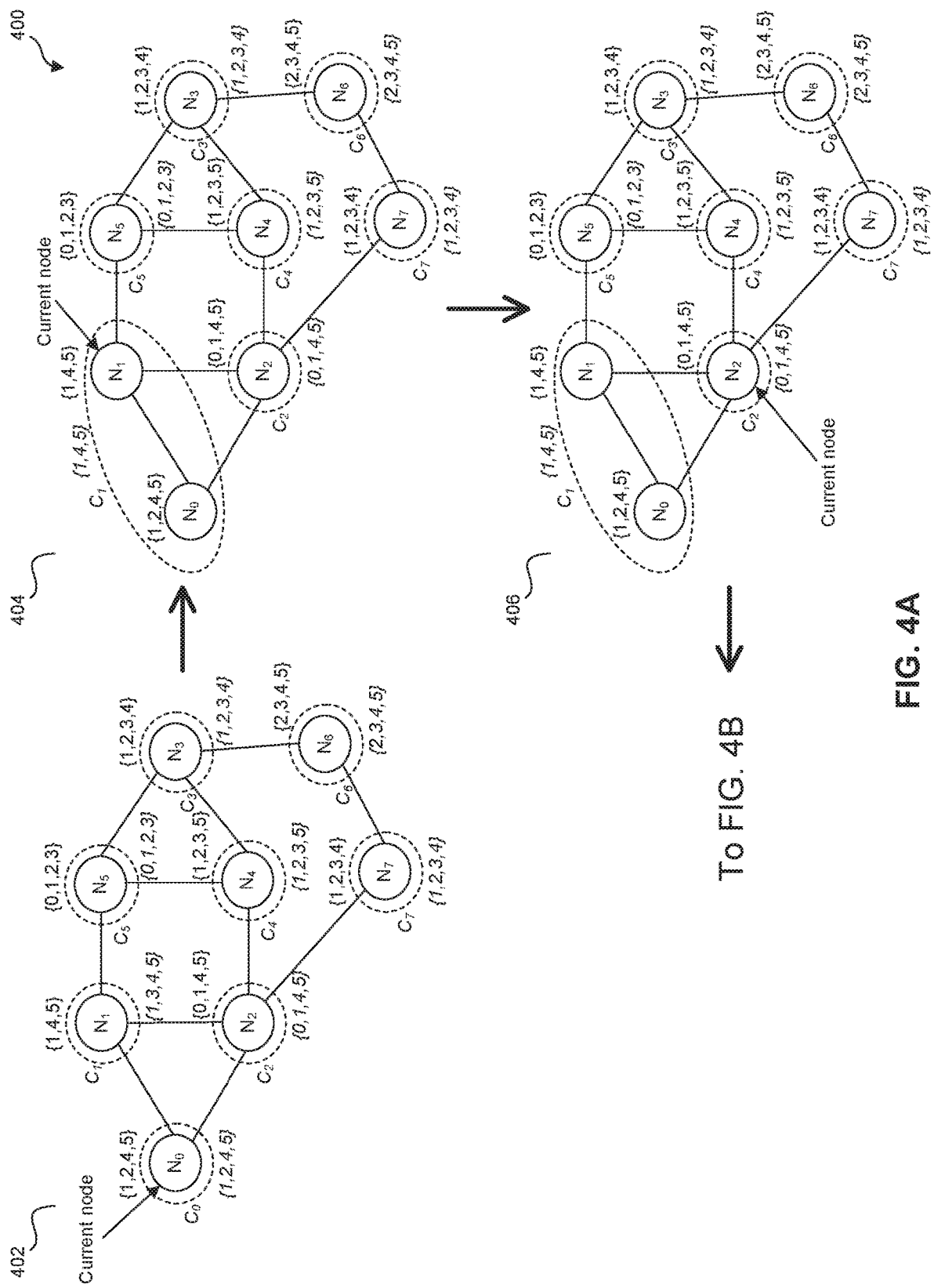
FIGS. 4A-4D are flowcharts illustrating an exemplary cluster determination for an exemplary data processing pipeline, according to some embodiments.
Figure 4B:
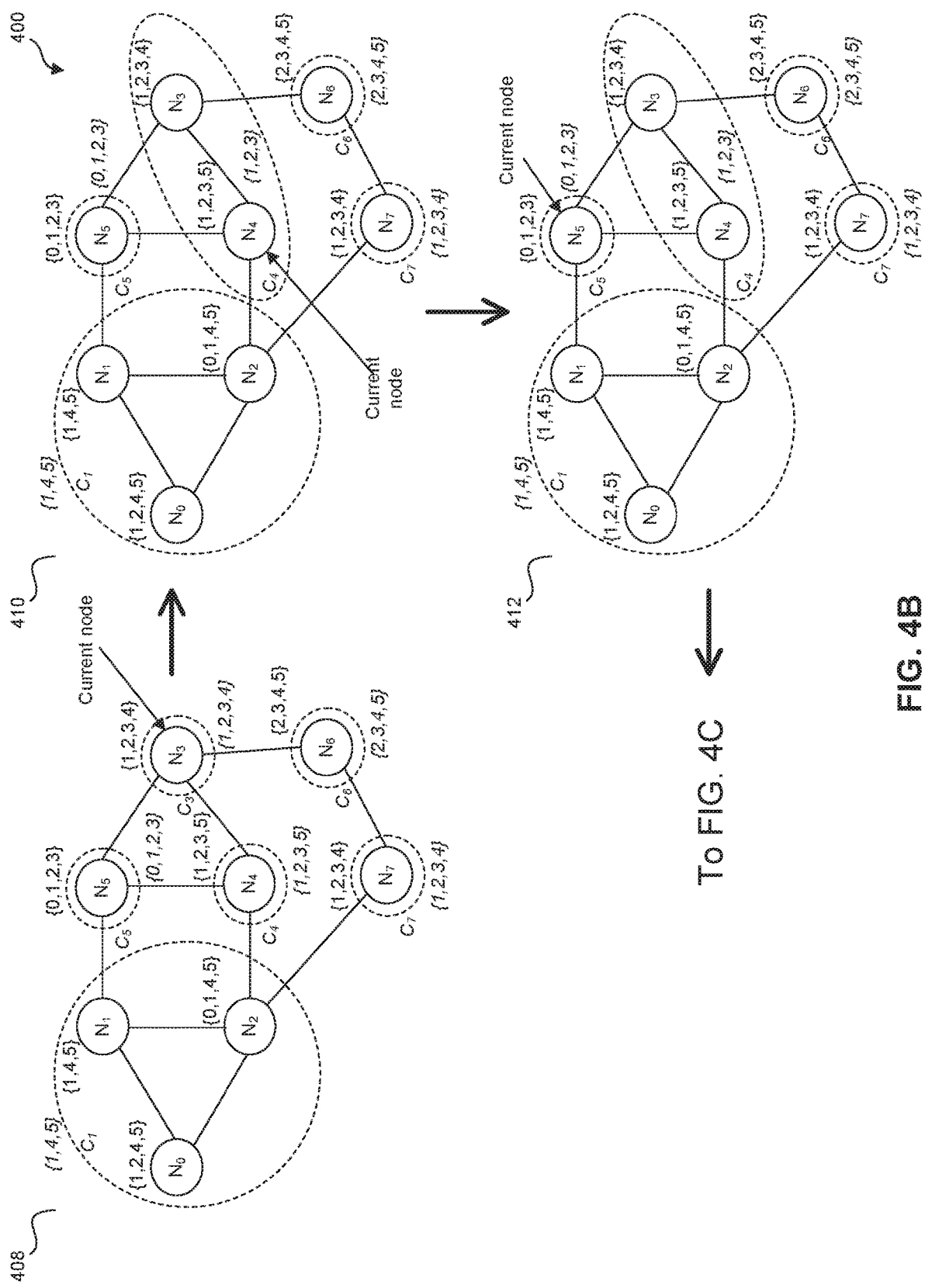
Figure 4C:
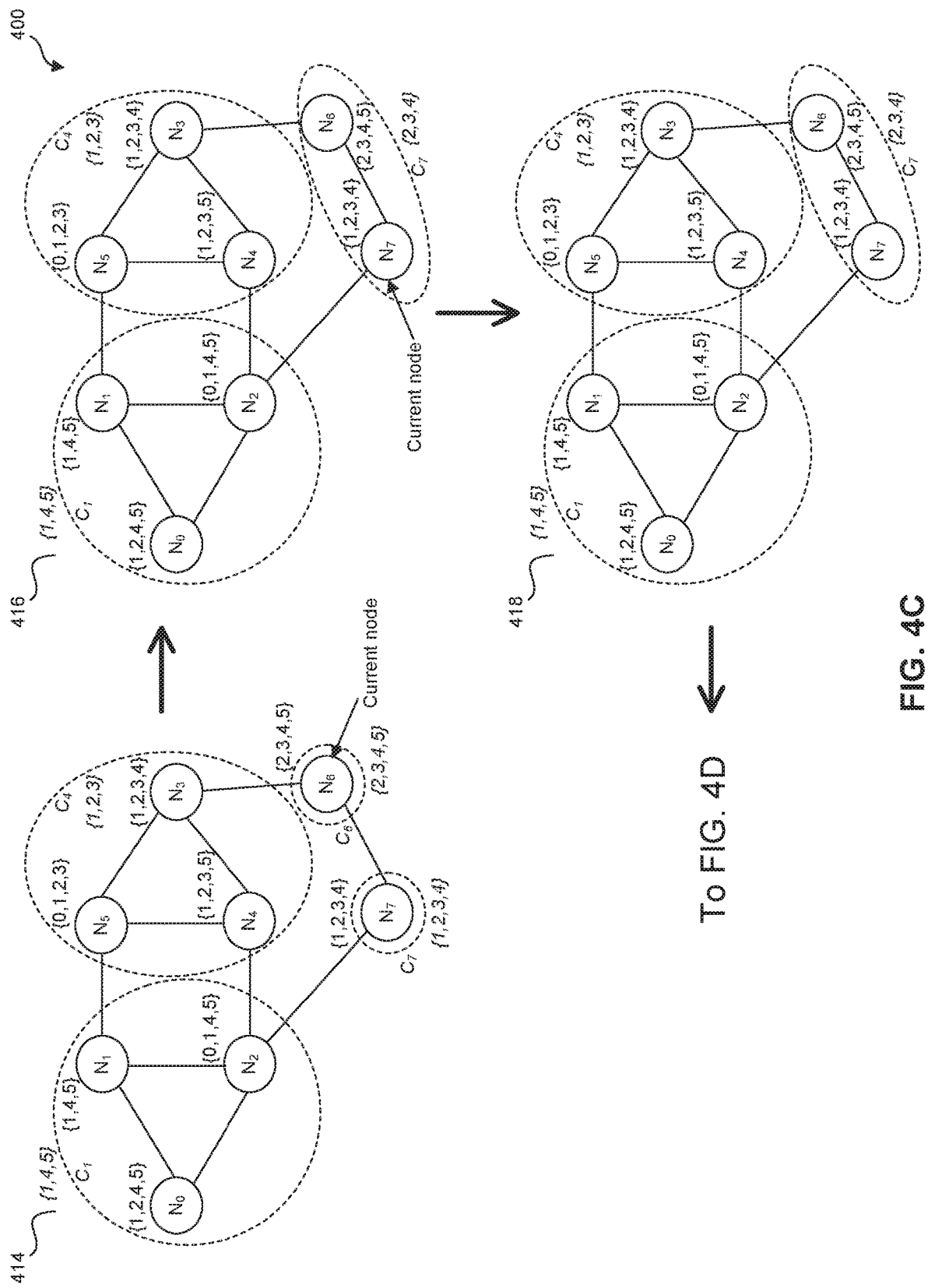
Figure 4D:
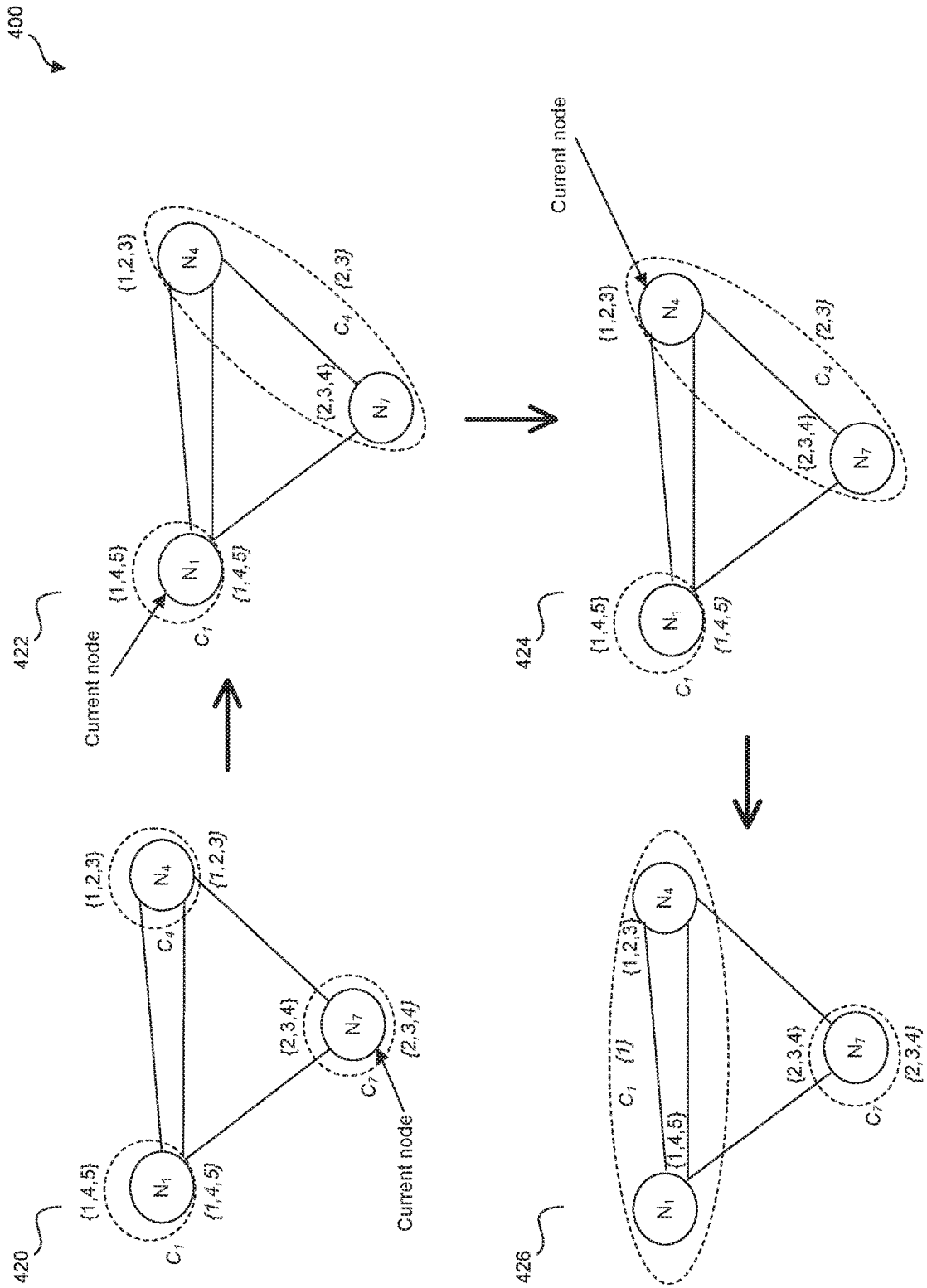

As discussed above, method 300 can be run recursively or iteratively, where subsequent iterations of method 300 traverse the clustering scheme determined by prior iterations. In such an embodiment, the determined clusters would serve as the nodes (operations) in subsequent iterations; the connections between these clusters would be the edges (connections). FIGS. 4A-4C represent a first iteration of method 400. FIG. 4D represents the second iteration of method 300, run against the clusters determined by the first iteration of method 300 in FIGS. 4A-4C.

In FIG. 4A, 402 portrays the initialization state of an example data processing pipeline. At commencement, the initialized clustering regime has one cluster corresponding to each node in the data processing pipeline. Every node is contained in a cluster, one-to-one. The set of labels for each cluster is to the set of labels for the singular node contained within that cluster.

402 shows the current node at $N_0$. The max gain is set to 0, and the best cluster is set to null. $N_0$ has 2 neighboring clusters: $C_1$ and $C_2$; these neighboring clusters could be examined in any order. The intersection of the labels of $N_0$ ($\{1, 2, 4, 5\}$) and $C_1$ ($\{1, 4, 5\}$) is $\{1, 4, 5\}$, and the gain of moving $N_0$ to $C_1$ is 1 because the newly formed cluster would contain 1 connection while losing 0. Because the intersection is not null and the gain of moving is greater than the max gain, the best cluster is set to $C_1$ and the max gain set to 1. The intersection of the labels of $N_0$ ($\{1, 2, 4, 5\}$) and $C_2$ ($\{0, 1, 4, 5\}$) is $\{1, 4, 5\}$, and the gain of moving would also be 1. Because the gain of moving is not greater than the max gain, no further change would be made. Accordingly, method 300 would proceed to a state reflected in 404 with $C_1$ now containing $N_0$ and $N_1$ with a cluster-associated set of labels for $C_1$ of $\{1, 4, 5\}$.

404 shows the current node at $N_1$. The max gain is set to 0, and the best cluster is set to null. $N_1$ has 2 neighboring clusters, $C_2$ and $C_5$; these neighboring clusters could be examined in any order. The intersection of the labels of $N_1$ ($\{1, 4, 5\}$) and $C_2$ ($\{0, 1, 4, 5\}$) is $\{1, 4, 5\}$, and the gain of moving $N_1$ to $C_2$ is 0 because the newly formed cluster would add 1 connection while losing 1 connection. Accordingly, because the gain of moving is not greater than the max gain, no change is made. Regarding $C_5$, the intersection of the labels of $N_1$ ($\{1, 4, 5\}$) and $C_5$ ($\{0, 1, 2, 3\}$) is $\{1\}$, but the gain of moving would also be 0. Because the gain of moving is not greater than the max gain, no change would be made. Accordingly, method 300 would proceed to a state reflected in 406 with no changes made to the clustering regime in 404.

406 shows the current node at $N_2$. The max gain is set to 0, and the best cluster is set to null. $N_2$ has 3 neighboring clusters, $C_1$, $C_4$, and $C_7$; these neighboring clusters could be examined in any order. The intersection of the labels of $N_2$ ($\{0, 1, 4, 5\}$) and $C_1$ ($\{1, 4, 5\}$) is $\{1, 4, 5\}$, and the gain of moving $N_1$ to $C_2$ is 2 because the newly formed cluster would add 2 more connections while losing 0. Accordingly, because the intersection is not null and the gain of moving is greater than the max gain, the best cluster is set to $C_1$ and the max gain set to 2. Subsequent examinations of $C_4$ and $C_7$ yield a gain of moving of only 1. Accordingly, method 300 would proceed to a state reflected in 408 with $C_1$ now containing $N_0$, $N_1$, and $N_2$ with a cluster-associated set of labels for $C_1$ as $\{1, 4, 5\}$.

408 shows the current node at $N_3$. The max gain is set to 0, and the best cluster is set to null. $N_3$ has 3 neighboring clusters, $C_4$, $C_5$, and $C_6$; these neighboring clusters could be examined in any order. The intersection of the labels of $N_3$ ($\{1, 2, 3, 4\}$) and $C_4$ ($\{1, 2, 3, 5\}$) is $\{1, 2, 3\}$, and the gain of moving $N_1$ to $C_2$ is 1 because the newly formed cluster would add 1 more connection while losing 0. Accordingly, because the intersection is not null and the gain of moving is greater than the max gain, the best cluster is set to $C_4$ and the max gain set to 1. Subsequent examinations of $C_5$ and $C_6$ would also find a gain of moving of 1. Because these gains of moving are not greater than the max gain, no further change would be made. Accordingly, method 300 would proceed to a state reflected in 410 with $C_4$ now containing $N_3$ and $N_4$ with a cluster-associated set of labels for $C_4$ as $\{1, 2, 3\}$.

410 shows the current node at $N_4$. The max gain is set to 0, and the best cluster is set to null. $N_4$ has 2 neighboring clusters, $C_1$ and $C_5$; these neighboring clusters could be examined in any order. The intersection of the labels of $N_4$ ($\{1, 2, 3, 5\}$) and $C_1$ ($\{1, 4, 5\}$) is $\{1, 5\}$, but the gain of moving $N_4$ to $C_1$ is 0 because the newly formed cluster would add 1 connection while losing 1 connection. Accordingly, because the gain of moving is not greater than the max gain, no change is made. Regarding $C_5$, the intersection of the labels of $N_4$ and $C_5$ is not null, but the gain of moving would also be 0, so no further change would be made. Accordingly, method 300 would proceed to a state reflected in 412 with no changes made to the clustering regime.

412 shows the current node at $N_5$. The max gain is set to 0, and the best cluster is set to null. $N_5$ has 2 neighboring clusters, $C_1$, and $C_4$; these neighboring clusters could be examined in any order. The intersection of the labels of $N_5$ ($\{0, 1, 2, 3\}$) and $C_1$ ($\{1, 4, 5\}$) is $\{1\}$, and the gain of moving $N_4$ to $C_1$ is 1 because the newly formed cluster would add 1 connection while losing 0 connections. Accordingly, because the gain of moving is greater than the max gain, the best cluster is set to C1 and the max gain is set to 1. $C_4$ is examined next. Here, the intersection of the labels of $N_5$ ({0, 1, 2, 3}) and $C_4$ ({1, 2, 3}) is {1, 2, 3}, and the gain of moving would be 2 because the newly formed cluster would add 2 connections while losing 0 connections. Accordingly, because the gain of moving is greater than the max gain, the best cluster is set to $C_4$ and the max gain is set to 2. Accordingly, method 300 would proceed to a state reflected in 414 with $C_4$ now containing $N_3$, $N_4$, and $N_5$ with a cluster-associated set of labels for $C_4$ of {1, 2, 3}.

414 shows the current node at $N_6$. The max gain is set to 0, and the best cluster is set to null. $N_6$ has 2 neighboring clusters, $C_4$, and $C_7$; these neighboring clusters could be examined in any order. The intersection of the labels of $N_6$ ({2, 3, 4, 5}) and $C_7$ ({1, 2, 3, 4}) is {2, 3, 4}, and the gain of moving would be 1 because the newly formed cluster would add 1 connections while losing 0 connections. Accordingly, because the gain of moving is greater than the max gain, the best cluster is set to $C_1$ and the max gain is set to 1. The intersection of the labels of $N_6$ ({2, 3, 4, 5}) and $C_4$ ({1, 2, 3}) is {2, 3}, and the gain of moving $N_6$ to $C_4$ is 1 because the newly formed cluster would add 1 connection while losing 0 connections. Accordingly, because the gain of moving is not greater than the max gain, no change is made. Method 300 would proceed to a state reflected in 416 with $C_7$ now containing $N_6$ and $N_7$ with a cluster-associated set of labels for $C_7$ of {2, 3, 4}.

416 shows the current node at $N_7$. The max gain is set to 0, and the best cluster is set to null. $N_7$ has 1 neighboring cluster, $C_1$. The intersection of the labels of $N_7$ ({1, 2, 3, 4}) and $C_1$ ({1, 4, 5}) is {1, 4}, and the gain of moving $N_7$ to $C_1$ is 0 because the newly formed cluster would add 1 connection while losing 1 connection. Accordingly, because the gain of moving is not greater than the max gain, method 300 would proceed to a state reflected in 418 with no changes made to the clustering regime.

418 reflects a version of the clustering regime upon completion of the first node. Here, as described in step 326 in relation to method 300, the node iteration process would repeat because a change had been made. Accordingly, the above iterative steps across all of the nodes would repeat. This second iteration, however, would find no changes to make. For example, though the intersection of the labels of $N_1$ ({1, 2, 3, 4}) and $C_4$ ({1, 2, 3}) is not null, the gain of moving $N_1$ to $C_4$ is 0 because the newly formed cluster would add 1 connection while losing 1 connection. No gain of moving would be greater than 0 for any of the nodes in the second node iteration. Though in an alternate example subsequent iterations could find additional changes to make and the iterations could continue to occur.

Accordingly, method 300 would proceed to conduct a graph reduction, creating a new graph with the clusters as the nodes of the new graph and the connections between the clusters are the connections between the nodes. Such a reduced graph is reflected in 420, and the node iteration would commence again acting upon the reduced graph.

420 shows the reduced graph with the current node at $N_7$. The max gain is set to 0, and the best cluster is set to null. $N_7$ has 2 neighboring clusters, $C_1$ and $C_4$; these neighboring clusters could be examined in any order. The intersection of the labels of $N_7$ ({2, 3, 4}) and $C_4$ ({1, 2, 3}) is {2, 3}, and the gain of moving would also be 1. Accordingly, because the gain of moving is greater than the max gain, the best cluster is set to $C_4$ and the max gain is set to 1. The intersection of the labels of $N_7$ ({2, 3, 4}) and $C_1$ ({1, 4, 5}) is {4}, and the gain of moving $N_7$ to $C_1$ is 1 because the newly formed cluster would add 1 connection while losing 0 connection. Because the gain of moving is not greater than the max gain, no change is made. Accordingly, method 300 would proceed to a state reflected in 422 with $C_4$ now containing $N_4$ and $N_7$ with a cluster-associated set of labels for $C_7$ of {2, 3}.

422 shows the current node at $N_1$. The max gain is set to 0, and the best cluster is set to null. $N_1$ has 1 neighboring cluster, $C_4$. The intersection of the labels of $N_7$ ({2, 3}) and $C_1$ ({1, 4, 5}) is null. Because the intersection of the labels is null, no change can be made. Accordingly, method 300 would proceed to a state reflected in 424 with no changes made to the clustering regime.

424 shows the current node at $N_4$. The max gain is set to 0, and the best cluster is set to null. $N_4$ has 1 neighboring cluster, $C_1$. The intersection of the labels of $N_4$ ({1, 2, 3}) and $C_1$ ({1, 4, 5}) is {1} and the gain of moving would be 1 because 2 connections would be added to the newly formed cluster while losing 1. Accordingly, method 300 would proceed to a state reflected in 426 with $C_1$ now containing $N_1$ and $N_4$ with a cluster-associated set of labels for $C_1$ of {1}.

426 shows the determined clusters. Data pipeline execution system 106 could subsequently utilize the optimized clustering regime to decide which programming language in which to execute operations 202 in order to avoid computationally expensive throttling between programming languages.

Figure 5:
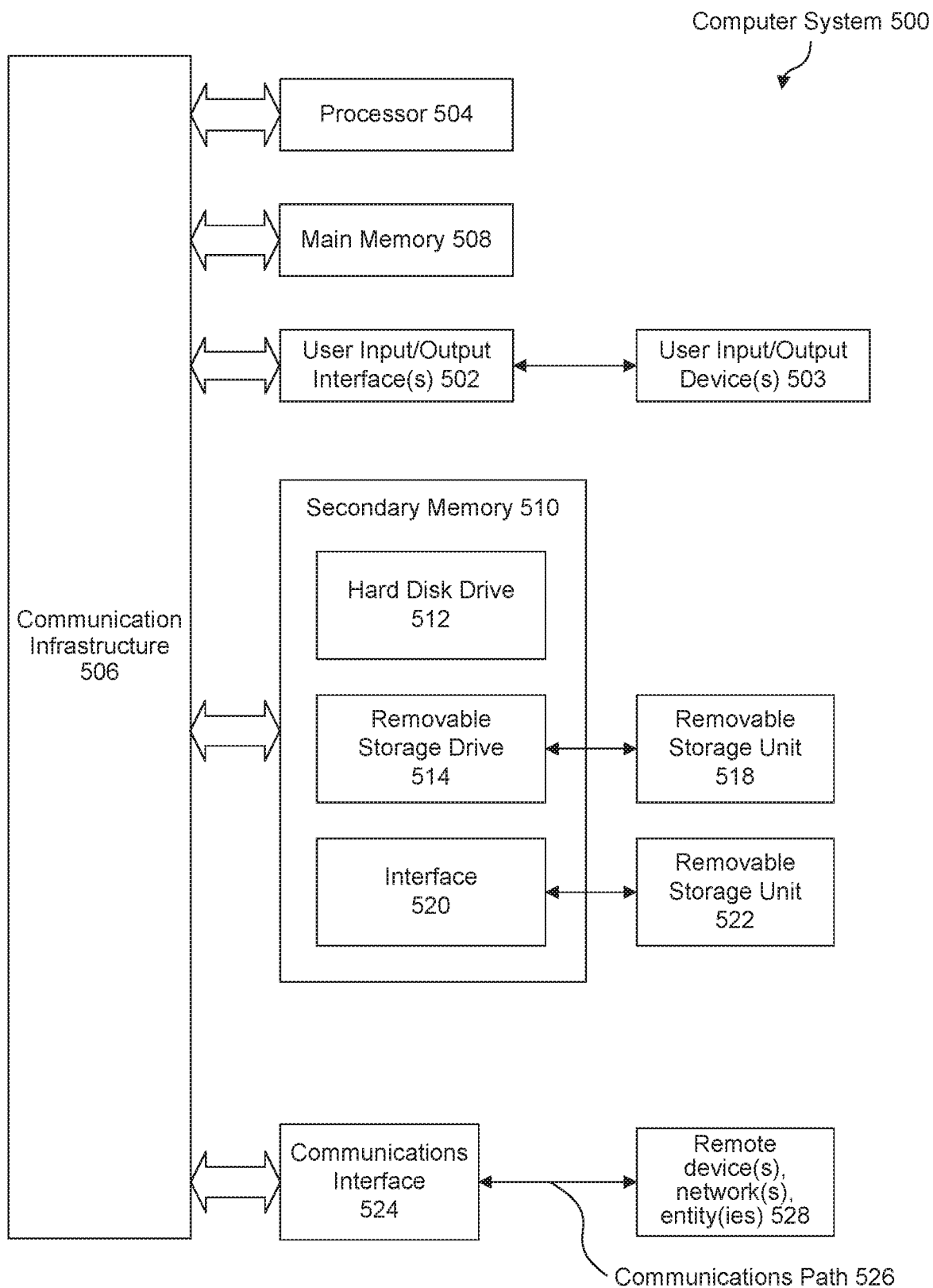
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving a data processing pipeline comprising operations and connections between the operations,
      wherein the operations are programmed in an operation-associated set of programming languages, and
      wherein the operations perform a transformational function on a set of data received by the data processing pipeline;
   grouping the operations into clusters,
      wherein the clusters are each assigned a cluster-associated set of programming languages based on the operation-associated set of programming languages for the operations in the clusters; and
   executing the operations in the clusters in a programming language contained in the cluster-associated set of programming languages,
      wherein at least one of the receiving, grouping, and executing are performed by one or more computers.

2. The method of claim 1, the grouping the operations into clusters further comprising:
   initializing the clusters so that each cluster encompasses one operation, wherein the cluster-associated set of programming languages matches the operation-associated set of programming languages for the encompassed operation;
   iterating through the operations, and for each operation:
   (1) setting a max gain to zero;
   (2) setting a best cluster to null;
   (3) determining a set of neighboring clusters for the operation, wherein the set of neighboring clusters are the clusters sharing a connection with the operation;
   (4) iterating through the set of neighboring clusters, and for each neighboring cluster:
      (a) determining a label intersection;
      (b) determining a gain of moving;
      (c) setting the max gain to the gain of moving and setting the best cluster to the neighboring cluster if the gain of moving is greater than the max gain and the label intersection is not null; and
   (5) moving the operation to the best cluster if the max gain is greater than zero; and
   repeating the initializing and iterating against an updated data processing pipeline derived from the prior iteration until an iteration occurs without modifying the clusters.

3. The method of claim 2, the determining a label intersection further comprising:
   calculating an intersection between the operation-associated set of programming languages associated for the operation and the cluster-associated set of programming languages for the neighboring cluster.

4. The method of claim 2, the determining a gain of moving further comprising:
   counting a number of internal connections added to the neighboring cluster if the operation moves to the neighboring cluster;
   counting a number of internal connections lost if the operation moves to the neighboring cluster; and
   calculating the gain of moving by subtracting the number of internal connections lost from the number of internal connections added.

5. The method of claim 2, the moving the operation to the best cluster further comprising:
   updating the cluster-associated set of programming languages for the best cluster by calculating an intersection of the operation-associated set of programming languages for the operation and the cluster-associated set of programming languages for the best cluster; and
   updating the cluster-associated set of programming languages for the operation's prior cluster by calculating an intersection of the sets of programming languages for all operations remaining in the operation's prior cluster.

6. The method of claim 2, wherein the updated data processing pipeline comprises operations set to the clusters determined during the previous iteration, connections between the operations set to the connections between the clusters determined during the previous iteration, and the operation-associated set of programming languages set to the cluster-associated set of programming languages determined during the previous iteration.

7. A system, comprising:
   a memory; and
   at least one processor coupled to the memory and configured to:
      receive a data processing pipeline comprising operations and connections between the operations,
         wherein the operations are programmed in an operation-associated set of programming languages, and
         wherein the operations perform a transformational function on a set of data received by the data processing pipeline;
      group the operations into clusters, wherein the clusters are each assigned a cluster-associated set of programming languages based on the operation-associated set of programming languages for the operations in the clusters; and
      execute the operations in the clusters in a programming language contained in the cluster-associated set of programming languages.

8. The system of claim 7, wherein to group the operations into clusters, the at least one processor is configured to:
   initialize the clusters so that each cluster encompasses exactly one operation, wherein the cluster-associated set of programming languages matches the operation-associated set of programming languages for the encompassed operation;
   iterate through the operations, and for each operation:
   (1) set a max gain to zero;
   (2) set a best cluster to null;
   (3) determine a set of neighboring clusters for the operation, wherein the set of neighboring clusters are the clusters sharing a connection with the operation;
   (4) iterate through the set of neighboring clusters, and for each neighboring cluster:
      (a) determine a label intersection;
      (b) determine a gain of moving;
      (c) set the max gain to the gain of moving and set the best cluster to the neighboring cluster if the gain of moving is greater than the max gain and the label intersection is not null; and
   (5) move the operation to the best cluster if the max gain is greater than zero; and
   repeat the initialize and iterate steps against an updated data processing pipeline derived from the prior iteration until an iteration occurs without modifying the clusters.

9. The system of claim 8, wherein to determine a label intersection, the at least one processor is configured to:
   calculate an intersection between the operation-associated set of programming languages associated for the operation and the cluster-associated set of programming languages for the neighboring cluster.

10. The system of claim 8, wherein to determine a gain of moving, the at least one processor is configured to:
    count a number of internal connections added to the neighboring cluster if the operation moves to the neighboring cluster;
    count a number of internal connections lost if the operation moves to the neighboring cluster; and
    calculate the gain of moving by subtracting the number of internal connections lost from the number of internal connections added.

11. The system of claim 8, wherein to move the operation, the at least one processor is configured to:
    update the cluster-associated set of programming languages for the best cluster by calculating an intersection of the operation-associated set of programming languages for the operation and the cluster-associated set of programming languages for the best cluster; and
    update the cluster-associated set of programming languages for the operation's prior cluster by calculating an intersection of the sets of programming languages for all operations remaining in the operation's prior cluster.

12. The system of claim 8, wherein the updated data processing pipeline comprises operations set to the clusters determined during the previous iteration, connections between the operations set to the connections between the clusters determined during the previous iteration, and the operation-associated set of programming languages set to the cluster-associated set of programming languages determined during the previous iteration.

13. A non-transitory computer-readable device having instructions stored thereon that, when executed by at least one computing device, causes the at least one computing device to perform operations comprising:
    receiving a data processing pipeline comprising operations and connections between the operations, wherein the operations are programmed in an operation-associated set of programming languages, and wherein the operations perform a transformational function on a set of data received by the data processing pipeline;
    grouping the operations into clusters, wherein the clusters are each assigned a cluster-associated set of programming languages based on the operation-associated set of programming languages for the operations in the clusters; and
    executing the operations in the clusters in a programming language contained in the cluster-associated set of programming languages.

14. The non-transitory computer-readable device of claim 13, the grouping further comprising:
    initializing the clusters so that each cluster encompasses exactly one operation, wherein the cluster-associated set of programming languages matches the operation-associated set of programming languages for the encompassed operation;
    iterating through the operations, and for each operation:
    (1) setting a max gain to zero;
    (2) setting a best cluster to null;
    (3) determining a set of neighboring clusters for the operation, wherein the set of neighboring clusters are the clusters sharing a connection with the operation;
    (4) iterating through the set of neighboring clusters, and for each neighboring cluster:
        (a) determining a label intersection;
        (b) determining a gain of moving;
        (c) setting the max gain to the gain of moving and setting the best cluster to the neighboring cluster if the gain of moving is greater than the max gain and the label intersection is not null; and
    (5) moving the operation to the best cluster if the max gain is greater than zero; and
    repeating the initializing and iterating against an updated data processing pipeline derived from the prior iteration until an iteration occurs without modifying the clusters.

15. The non-transitory computer-readable device of claim 14, the determining a label intersection further comprising:
    calculating an intersection between the operation-associated set of programming languages associated for the operation and the cluster-associated set of programming languages for the neighboring cluster.

16. The non-transitory computer-readable device of claim 14, the determining a gain of moving further comprising:
    counting a number of internal connections added to the neighboring cluster if the operation moves to the neighboring cluster;
    counting a number of internal connections lost if the operation moves to the neighboring cluster; and
    calculating the gain of moving by subtracting the number of internal connections lost from the number of internal connections added.

17. The non-transitory computer-readable device of claim 14, the moving the operation to the best cluster further comprising:
    updating the cluster-associated set of programming languages for the best cluster by calculating an intersection of the operation-associated set of programming languages for the operation and the cluster-associated set of programming languages for the best cluster; and
    updating the cluster-associated set of programming languages for the operation's prior cluster by calculating an intersection of the sets of programming languages for all operations remaining in the operation's prior cluster.

18. The non-transitory computer-readable device of claim 14, wherein the updated data processing pipeline comprises operations set to the clusters determined during the previous iteration, connections between the operations set to the connections between the clusters determined during the previous iteration, and the operation-associated set of programming languages set to the cluster-associated set of programming languages determined during the previous iteration.

19. The method of claim 1, further comprising:
    providing a data configuration tool that displays a visualization of the data processing pipeline comprising the operations used in the processing pipeline, the connections between the operations, and the operation-associated programming languages associated with the operations.

20. The system of claim 7, wherein the at least one processor is configured to:
    provide a data configuration tool that displays a visualization of the data processing pipeline comprising the operations used in the processing pipeline, the connections between the operations, and the operation-associated programming languages associated with the operations.

* * * * *